(12) United States Patent
Tokunaga et al.

(10) Patent No.: US 7,019,516 B2
(45) Date of Patent: Mar. 28, 2006

(54) MAGNETIC SENSOR UNIT LESS RESPONSIVE TO LEAKING MAGNETIC FLUX

(75) Inventors: Masao Tokunaga, Gamagori (JP); Kenji Takeda, Okazaki (JP); Tomomitsu Kamiya, Takahama (JP)

(73) Assignees: Nippon Soken, Inc., (JP); Denso Corporation, (JP)

( * ) Notice: Subject to any disclaimer, the term of this patent is extended or adjusted under 35 U.S.C. 154(b) by 197 days.

(21) Appl. No.: 10/458,661

(22) Filed: Jun. 11, 2003

(65) Prior Publication Data

US 2004/0000902 A1    Jan. 1, 2004

(30) Foreign Application Priority Data

Jun. 26, 2002    (JP)    ............................. 2002-186017

(51) Int. Cl.
G01B 7/30    (2006.01)
G01B 7/14    (2006.01)

(52) U.S. Cl. .............................. 324/207.25; 324/207.22
(58) Field of Classification Search ........... 324/207.25, 324/207.2, 207.21, 207.22; 310/46, 103, 310/152, 156.01, 154.01, 68 B, 156.06
See application file for complete search history.

(56) References Cited

U.S. PATENT DOCUMENTS

| | | | |
|---|---|---|---|
| 4,311,933 A * | 1/1982 | Riggs et al. ........... 310/156.06 |
| 5,303,012 A * | 4/1994 | Horlacher et al. ........... 335/253 |
| 5,444,369 A * | 8/1995 | Luetzow ................... 324/207.2 |
| 5,544,000 A * | 8/1996 | Suzuki et al. ............... 361/139 |
| 5,781,005 A * | 7/1998 | Vig et al. ................. 324/207.2 |
| 6,124,710 A * | 9/2000 | Kordecki ................. 324/207.2 |
| 6,559,637 B1 * | 5/2003 | Miyata et al. ........... 324/207.2 |
| 6,879,150 B1 * | 4/2005 | Sekiya ................... 324/207.25 |
| 2001/0048302 A1* | 12/2001 | Kogure et al. ........... 324/207.2 |

FOREIGN PATENT DOCUMENTS

| | | | |
|---|---|---|---|
| JP | 59223026 A | * | 12/1984 |
| JP | 09072706 A | * | 3/1997 |
| JP | 2000-88600 | | 3/2000 |
| JP | 2000088600 A | * | 3/2000 |

* cited by examiner

Primary Examiner—Bot Ledynh
Assistant Examiner—David M Schindler
(74) Attorney, Agent, or Firm—Nixon & Vanderhye PC

(57) ABSTRACT

A magnetic sensor unit includes an actuator motor and a magnetic position sensor. The actuator motor has a magnetic circuit including motor magnets. The magnetic position sensor includes a sensor magnet and a hall element for detecting magnetic flux. Magnet clearances are formed between the motor magnets. The hall element is disposed outside of the motor to detect the magnetic flux in a direction penetrating through the magnet clearances, and which is perpendicular to a direction from one of the motor magnets to the other. In this disposition of the hall element, it is restricted that the hall element detects leaking magnetic flux from the motor magnets.

7 Claims, 6 Drawing Sheets

FIG. 9 ic flux detecting device is restricted to detect the leaking magnetic flux of the magnetic circuit, so that a magnetically detecting error of the magnetic position sensor is restricted.

MAGNETIC SENSOR UNIT LESS RESPONSIVE TO LEAKING MAGNETIC FLUX

CROSS REFFERENCE TO RELATED APPLICATION

This application is based on Japanese Patent Application No. 2002-186017 filed on Jun. 26, 2002, the disclosure of which is incorporated herein by reference.

BACKGROUND OF THE INVENTION

1. Field of the Invention

The present invention relates to a magnetic sensor unit, which is principle system of an actuator for an automobile and installed in the actuator.

2. Description of Related Art

A conventional magnetic sensor unit includes a magnetic circuit, for example, which converts electricity into driving force or torque. A position sensor is provided in the actuator that requires a precise driving mechanism, for example, the actuator for controlling intake valves of an engine of the automobile. The position sensor detects the rotating amount or the driving amount of members rotated or driven by the magnetic sensor unit. As a position detecting method of the position sensor, a magnetically detecting method, a contact resistance detecting method, an optically detecting method and so on are employed for the actuator. However, for example, the actuator for controlling the intake valves is placed in an engine compartment, which is a harsh environment for the actuator. Therefore, the magnetically detecting method is mostly often employed for the actuator for controlling the intake valves.

An oscillatory actuator having a magnetic position sensor is disclosed in JP-A-2000-88600. In this actuator, when a magnetic circuit inside an actuator motor is close to a magnetic flux detecting device, the magnetic flux detecting device detects leaking magnetic flux from the magnetic circuit. That is, there is a possibility that the magnetic flux detecting device cannot detect the magnetic flux of a sensor magnet accurately.

SUMMARY OF THE INVENTION

In view of the foregoing problems, it is an objective of the present invention to provide a magnetic sensor unit, which is compact and has a simple structure, wherein a magnetic position sensor of the magnetic sensor unit is restricted to detect leaking magnetic flux from devices other than a sensor magnet of the magnetic position sensor.

According to the present invention, a magnetic sensor unit has an actuator motor and a magnetic position sensor. The actuator motor has a magnetic circuit. The magnetic position sensor is for magnetically detecting a rotational position of the actuator motor. The magnetic position sensor includes a magnetic flux detecting device and a magnetic flux generating unit. The magnetic flux generating unit generates a predetermined amount of magnetic flux toward the magnetic flux detecting device in accordance with the rotational position of the actuator motor. The magnetic flux detecting device is disposed in a position and a direction outside of the magnetic circuit, where the magnetic flux detecting device is least responsive to leaking magnetic flux of the magnetic circuit of the actuator motor.

Accordingly, since the magnetic flux detecting device is disposed in the position and the direction, where the mag-

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE PRESENTLY PREFERRED EMBODIMENT

An embodiment of the present invention will be described in detail with reference to the accompanying drawings.

Figure 1A:
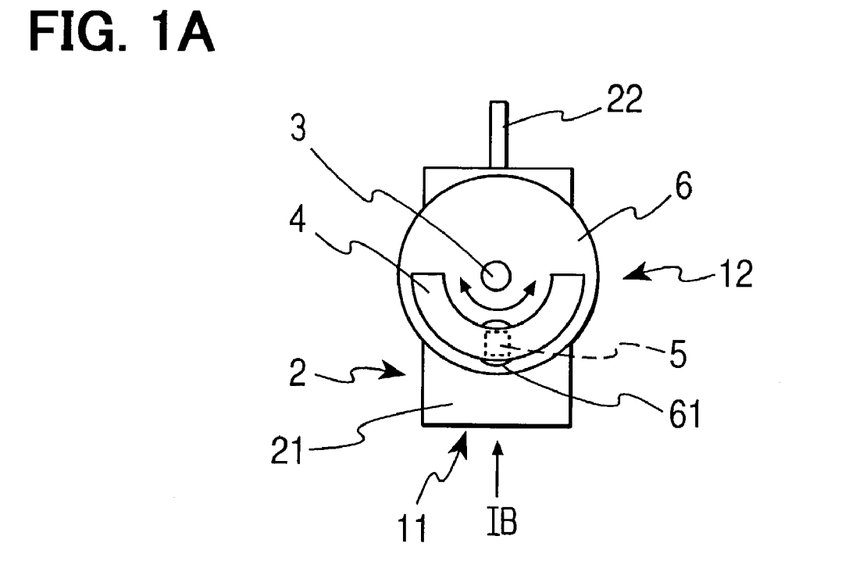
FIG. 1A is a schematic plan view of a magnetic sensor unit according to the present invention.
Figure 1B:
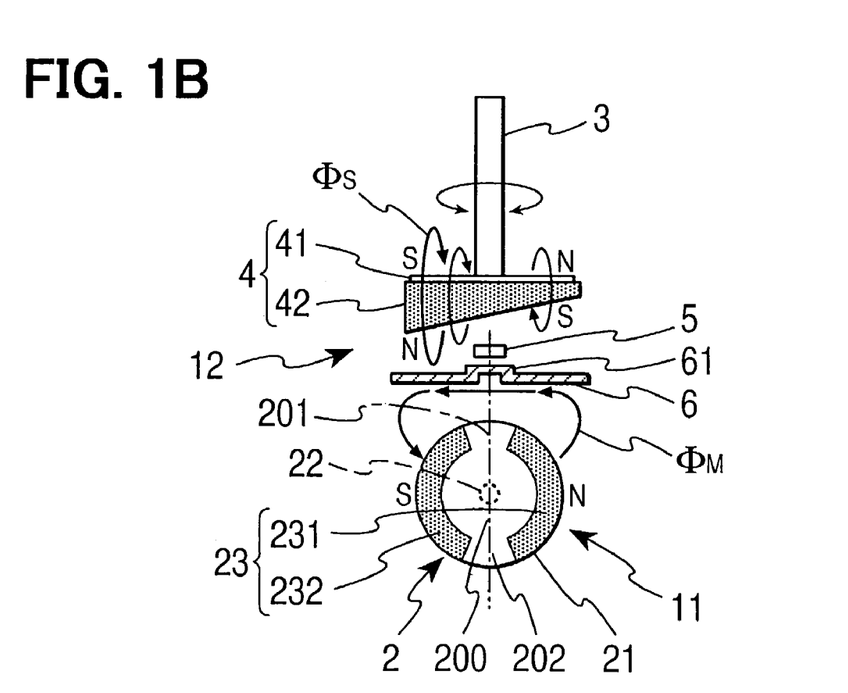
FIG. 1B is a schematic cross-sectional view of the magnetic sensor unit according to the present invention, which is viewed in a direction IB in FIG. 1A.

As shown in FIGS. 1A and 1B, a magnetic sensor unit 11, which is housed inside an actuator, has an actuator motor 2, which has a well-known motor structure, as a principal portion thereof. The actuator motor 2 has a cylindrical motor case 21 and a motor shaft 22. The motor shaft 22 projects in a center of one end surface of the case 21. Moreover, inside the motor case 21, the actuator motor 2 has a magnetic circuit including a pair of motor magnets 231, 232. Each cross section of the motor magnets 231, 232 has an arc-shape. Moreover, the motor magnets 231, 232 are disposed along an inner surface of the motor case 21 symmetrically in a circumferential direction of the motor shaft 22. For example, the magnets 231, 232 are made of a permanent magnet. The magnets 231, 232 are opposed each other in a diametrical direction of the motor shaft 22. A rotor (not shown) is stored in a substantially cylindrical space 200 surrounded by the motor magnets 231, 232. Opposed magnetic surfaces of the magnets 231, 232 are respectively a south pole and a north pole.

In one side of the motor case 21, a drive shaft 3 is provided in a direction perpendicular to the motor shaft 22 without intersecting each other. The drive shaft 3 is geared with a motor shaft 22 by a gear system (not shown), so that the drive shaft 3 can revolve in a state where the drive shaft 3 and the motor shaft 22 are not directly engaged.

The magnetic sensor unit 11 has a magnetic position sensor 12. The magnetic position sensor 12 includes a magnetic flux generating unit 4 (magnetic flux generating means) including an arc-shaped sensor yoke 41 and an arc-shaped sensor magnet 42. The axes of the sensor yoke 41 and the sensor magnet 42 correspond to the axis of the drive shaft 3. The sensor magnet 42 is clung to a surface, which is in opposition to the actuator motor 2, of the sensor yoke 41. The magnetic poles of the sensor magnet 41 are positioned at the upper and lower surface parts in FIG. 1B. The magnetic converter 4 revolves with the drive shaft 3 integrally. The thickness of the sensor magnet 42 increases by degrees in one circumferential direction of the sensor magnet 42. That is, the magnetic surface, in opposition to the actuator motor 2, of the sensor magnet 42 has a shape of a spiral slope.

Moreover, the magnetic sensor 12 has a hall effect element 5 (magnetic flux detecting device) for detecting a magnetic flux. The hall element 5 is disposed under the sensor magnet 42. The hall element 5 is opposed to the lower magnetic surface of the sensor magnet 42. When the sensor magnet 42 revolves with the drive shaft 3, the thickness of a part opposing to the hall element 5 of the magnet 42 changes. A thick part of the sensor magnet 42 generates more magnetic flux, and a thin part of the sensor magnet 42 generates less magnetic flux. Therefore, when the sensor magnet 42 revolves, the hall element 5 detects a change of the amount of the magnetic flux by a change of the thickness of the opposed part of the sensor magnet 42. Since the direction in which the hall element 5 detects the magnetic flux is parallel with the axis of the drive shaft 3, the hall element 5 can detect the magnetic flux of the sensor magnet 42 efficiently.

Generally, when the hall element 5 is disposed at a position opposing the circumference of the magnetic pole surface of the sensor magnet 42, the hall element 5 can detect a rotational position of the drive shaft 3. In this actuator, however, the hall element 5 is disposed in a direction penetrating through magnet clearances 201, 202 between the magnets 231, 232 and is in a diametrical direction of the motor shaft 22, i.e., a direction perpendicular to the direction from one of the motor magnets 231, 232 to the other. A function provided by this disposition of the hall element 5 will be described hereinafter.

Between the hall element 5 and the motor 2, a disc-shaped motor yoke 6 (partitioning board) is provided. The motor yoke 6 is parallel with the sensor yoke 41. The diameter of the motor yoke 6 is a little larger than that of the motor case 21. The motor yoke 6 collects leaking magnetic flux øM of the motor magnets 231, 232 and returns the leaking magnetic flux øM to the motor magnets 231, 232 again. Therefore, the motor yoke 6 serves as a magnetic shield for the hall element 5, so that the motor yoke 6 reduces influence of the leaking magnetic flux on the hall element 5.

A part of the motor yoke 6, which is opposed to the hall element 5, projects toward the hall element 5 and forms a stepped portion 61. The stepped portion 61 functions as a yoke, which leads magnetic fluxes øS of the sensor magnet 42, so that the magnetic flux that penetrates through the hall element 5 increases. Therefore, a magnetic detecting performance of the hall element 5 can be enhanced.

Figure 2A:
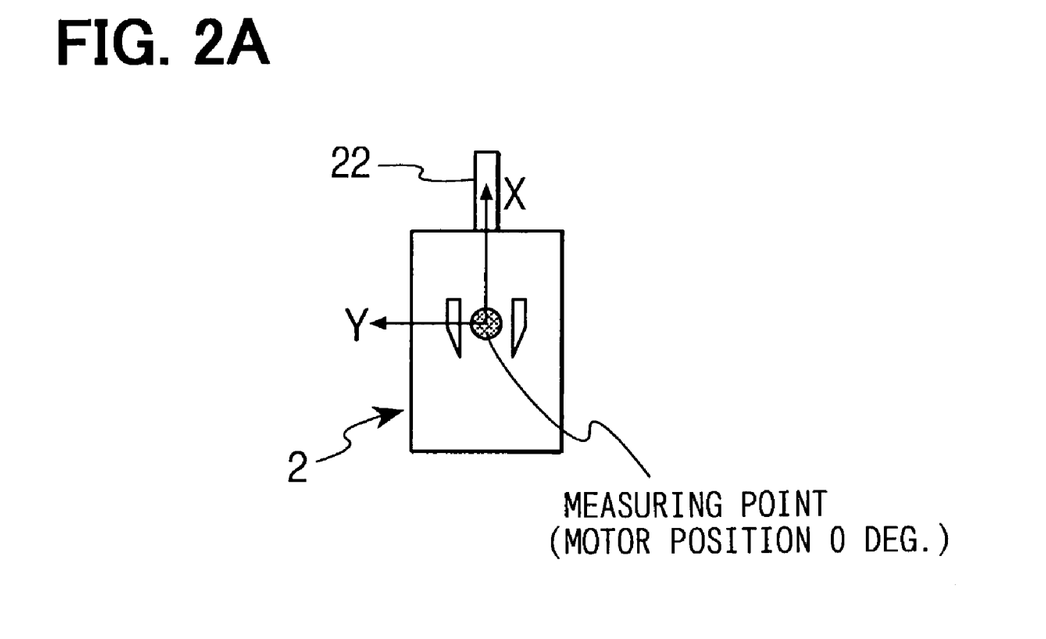
FIGS. 2A and 2B are views illustrating an experiment in which leaking magnetic flux around an actuator motor of the magnetic sensor unit is measured by a probe.
Figure 2B:
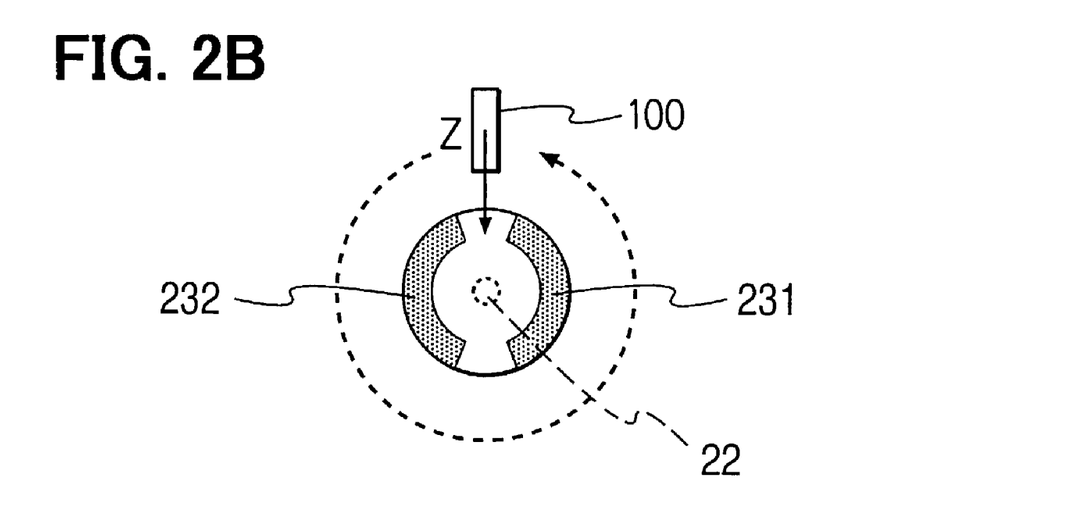
Figure 3:
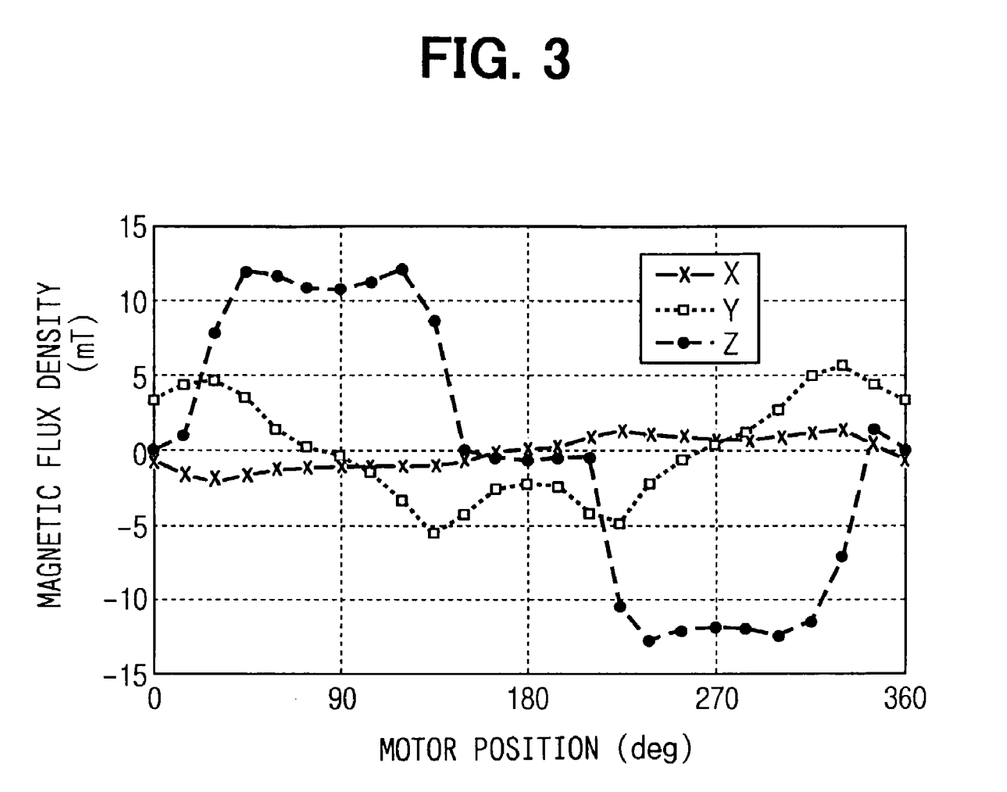
FIG. 3 is a graph showing results of measurements made by the method shown in FIGS. 2A and 2B.

A positional relation between the hall element 5 and the motor magnets 231, 232 are as follows. With the use of the above motor 2, the leaking magnetic flux of the magnets 231, 232 around the motor case 21 is measured by a probe 100. As shown in FIGS. 2A and 2B, in every part around the motor case 21, the leaking magnetic flux is measured in three directions. The three directions are the direction X that is an axial direction of the motor shaft 22, the direction Y that is a circumferential direction of the motor shaft 22, and the direction Z that is a diametrical direction of the motor shaft 22. Results of the measurement are shown in FIG. 3. The motor position (degree) in a horizontal axis in FIG. 3 shows a rotational position of the probe 100 in FIG. 2B, wherein 0 (degree) is a position of the hall element 5 in the actuator, and a circumferential position of the hall element 5 around the motor 2 is shown in the horizontal axis as the motor position.

In every measurement, the measured magnetic flux in the direction X is substantially 0. Moreover, the measured magnetic flux in the direction Y becomes 0 about 90 (degrees) and 270 (degrees) positions, and shows proper values corresponding to the motor positions in the other motor positions. Contrary to the direction Y, the magnetic flux in the direction Z becomes 0 about 0 (deg) and 180 (degrees) and shows proper values corresponding to the motor positions in the other motor positions. Furthermore, though the measured magnetic flux in the direction X shows high absolute values about 90 (degrees) and 270 (degrees), the absolute values are higher than maximum absolute values of the magnetic flux in the direction Y. The reason is as follows.

Lines of magnetic flux of the magnets 231, 232 are generated vertically from the magnetic surface of their north pole (N), and curve greatly, and enter the magnetic surface of their south pole (S) vertically. Therefore, in each direction from one of the magnets 231, 232 to the other, i.e., 0 (deg) and 180 (degrees) of the motor positions in FIG. 3, the magnetic flux in the direction Z is high. In each direction penetrating through the magnet clearances 201, 202, i.e., 90 (degrees) and 270 (degrees) of the motor positions in FIG. 3, the magnetic flux is high.

Moreover, from the following reasons, the magnetic flux in each direction penetrating through the magnet clearances 201, 202 (0 (deg) and 180 (degrees)) becomes lower than that in each direction from one of the magnets 231, 232 to the other (90 (degrees) and 270 (degrees)). The magnets 231, 232 are disposed symmetrically around the motor shaft 22, and the opposing magnetic surfaces of the magnets 231, 232 are different magnetic poles. Therefore, in the direction penetrating through the magnet clearances 201, 202, the magnetic flux of the motor magnet 231 and the magnetic flux of the motor magnet 232 are canceled by each other.

As described above, in each direction penetrating through the magnet clearances 201, 202 (0 (deg) and 180 (degrees)), the leaking magnetic flux is small, so that the detected error in the hall element 5 can be restricted.

The magnetic flux in each direction penetrating through the magnet clearances 201, 202 (0 (deg) and 180 (degrees)) is much. However, in this actuator, since the hall element 5 is disposed to detect the magnetic flux in the direction Z, the hall element 5 does not detect the magnetic flux substantially, and the influence of the leaking magnetic flux is little for the hall element 5.

Furthermore, the magnetic flux in the direction X is very little, and the hall element 5 is disposed to detect the magnetic flux in the direction Z. Therefore, the influence of the leaking magnetic flux from the magnets 231, 232 is very little.

In this actuator, the hall element 5 is disposed in each direction penetrating through the magnet clearances 201, 202 and in the diametrical direction of the motor shaft 22. However, when the hall element 5 is shifted in a surface perpendicular to a magnetic detecting direction of the hall element 5, the influence of the leaking magnetic flux for the hall element 5 is caused as follows. When the magnetic flux density in the direction Y is defined as BY, and the magnetic flux density in the direction Z is defined as BZ, and the motor position is defined as θ (degree), the amount of the magnetic flux density detected in the hall element 5 is equal to BZ*cos θ+By*sin θ.

Figure 4:
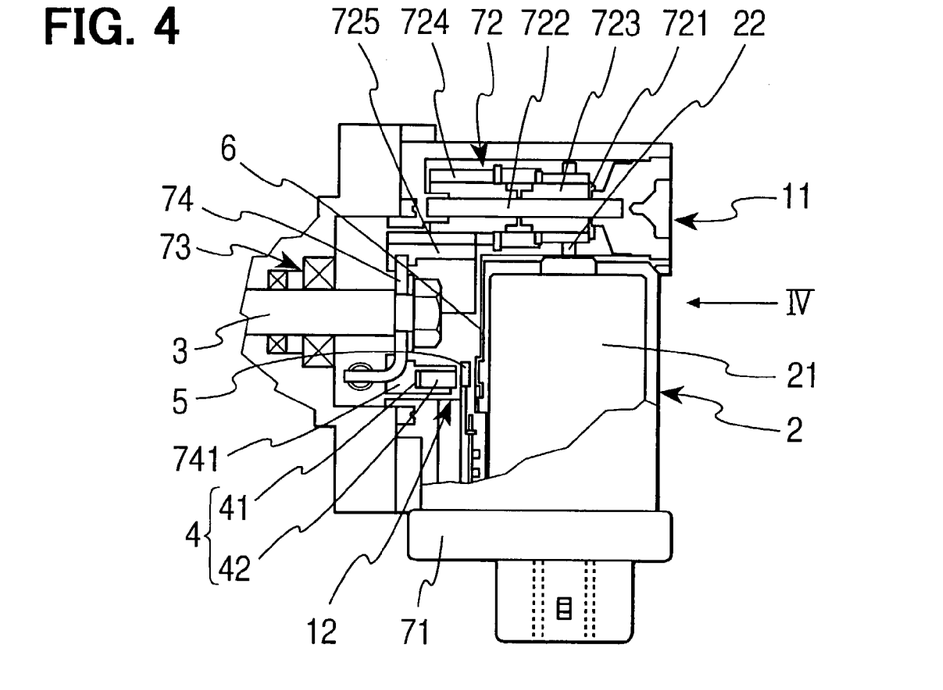
FIG. 4 is a partially cross-sectional view of an embodiment to which the magnetic sensor unit of the present invention is applied.
Figure 5:
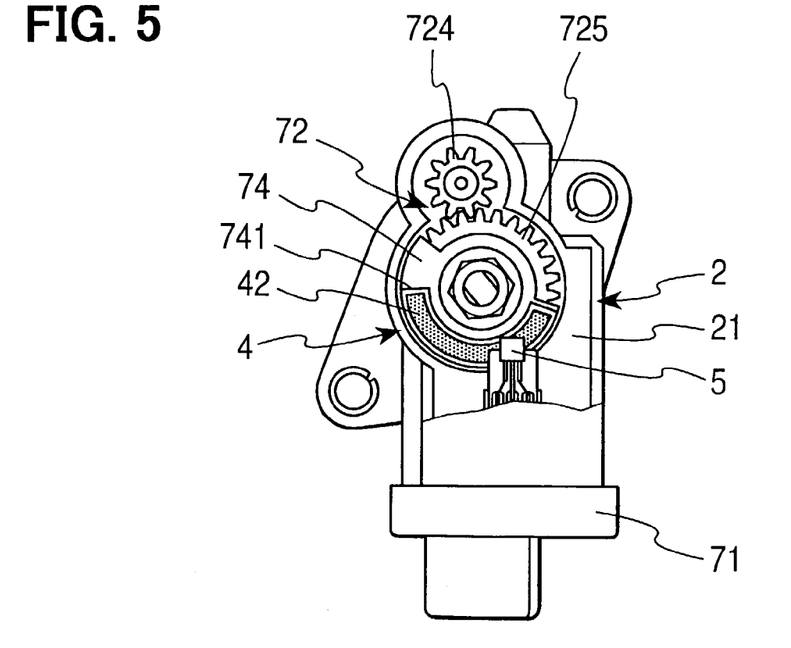
FIG. 5 is a partially cross-sectional view of the embodiment viewed in a direction IV in FIG. 4.

An embodiment of an actuator using the magnetic sensor unit according to the present invention is shown in FIGS. 4 and 5. Components similar to those described in FIG. 1 will be indicated by the similar numerals, and thus will not be described further. Inside a housing 71, the motor 2, a gear system 72 and so on, which form the magnetic sensor unit 11, are housed, so that the drive shaft 3 can revolve with the use of the rotational force of the motor 2. The drive shaft 3 is disposed transversely to the motor 2 and perpendicularly to the motor shaft 22 and supported by a bearing 73. The gear system 72 is disposed in a part between a top of the motor 2 and an inside end of the drive shaft 3.

In the gear system 72, a helical gear 721 is mounted on the motor shaft 22, which is projected in an upper end surface of the case 21 of the motor 2. A first gear 723 is mounted on a gear shaft 722. Moreover the helical gear 721 is geared with the first gear 723, so that the revolution of the motor shaft 22 is communicated to revolve with the gear shaft 722. The gear shaft 722 is disposed in parallel with the drive shaft 3. In addition to the first gear 723, a second gear 724 is geared with the gear shaft 722, and both ends of the gear shaft 722 are supported by the both gears. The second gear 724 is geared with a third gear 725 mounted on an end of the drive shaft 3.

The gear 725 projects in an end surface of a disc-shaped base portion 74, the axis of which corresponds to that of the drive shaft 3. Moreover, in the end surface of the base portion 74, in addition to the gear 725, the yoke 41 and an arc-shaped stepped portion 741 are provided. On the stepped portion 741, the sensor magnet 42 is mounted. The stepped portion 741 is formed in a same circumference as that of the gear 725 and occupies substantially half circumference. On a stepped surface of the stepped portion 741, an arc-shaped groove is formed, so that the yoke 4 and the magnet 42 are fit in the groove in this order.

The hall element 5 is provided in opposition to the sensor magnet 42. The magnetic detecting direction of the hall element 5 is parallel to the drive shaft 3. Moreover, the hall element 5 is disposed in each direction penetrating through the magnet clearances 201, 202 (shown in FIG. 1) and in the diametrical direction of the motor shaft 22.

Moreover, a positional relation between the gear shaft 722 and the drive shaft 3 is formed. In the relation, when the drive shaft 3 rotates in a predetermined rotational angular range, which is required in a specification of the actuator, and the hall element 5 exceeds the predetermined rotational angular range of the sensor magnet 42, the gear 725 and the gear 724 are geared in all of the range.

Various kinds of the output characteristics of the hall element 5 are realized by various kinds of the magnets 42. Despite the kind of the magnet 42, the magnetic sensor unit 11 can be employed for the actuator. Three kinds of the magnets 42 are shown as the first to third examples in FIGS. 6A and 6B, FIGS. 7A and 7B, and FIGS. 8A and 8B. A relation between a rotational position of each magnet and a corresponding magnetic flux density is shown in FIG. 9.

Figure 6A:
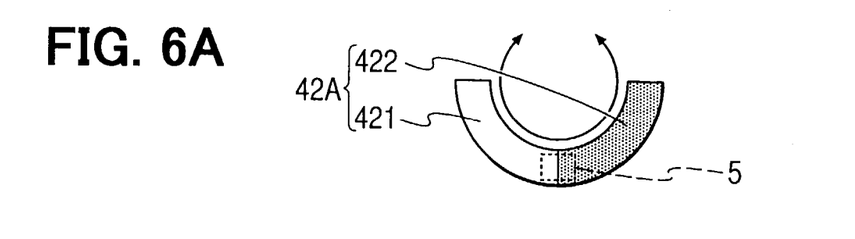
FIGS. 6A and 6B are plan and side views of a first example of a sensor magnet for the embodiment of the present invention.
Figure 6B:
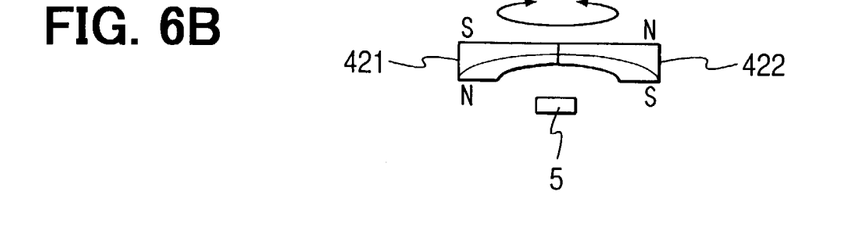

A magnet 42A (sloped arc-shaped magnet unit) shown in FIGS. 6A and 6B as the first example is composed of magnets 421, 422 (sloped arc-shaped magnet portions) integrally, in a manner that each of the magnets 421, 422 has magnetic poles in a vertical direction in FIG. 6B. Each of the magnets 421, 422 has a substantial 90 degrees arc-shape, so that the magnet 42A has a substantial 180 degrees arc-shape. Each of the magnets 421, 422 has a taper tapering toward each facing surface. Each thickness of the magnets 421, 422 is thinnest in each attaching part. In FIG. 6B, an upper surface and a lower surface of the magnet 42A are magnetic surfaces. The magnetic surface of the magnet 42A in opposition to the hall element 5 has a slope. A sloped surface of the magnet 421 is a north pole, and a sloped surface of the magnet 422 is a south pole. The magnets 421, 422 are substantially equal magnets, but the polar characteristics of the same are contrary. When the magnet 42A is used, the thicknesses of the magnets 421, 422 are the thinnest in their attaching parts, and each magnetic flux of the magnets 421, 422 is canceled in each attaching part. Therefore, in one rotational position, the magnetic flux detected in the hall element 5 becomes 0, and the direction of the magnetic flux is inverted. When the rotational position where the magnetic flux is detected as 0 is defined as 0 (degree), the inverted magnetic flux density can be detected as a negative value from the hall element 5. In this case, the rotational position, where the magnetic flux density is detected as 0, can be defined as a standard point. In a point where the magnetic flux is detected as 0, the detected amount of the magnetic flux is not changed by the temperature. Therefore, the standard point is restricted from drifting by the temperature, and high measuring accuracy of the actuator can be realized.

Figure 7A:
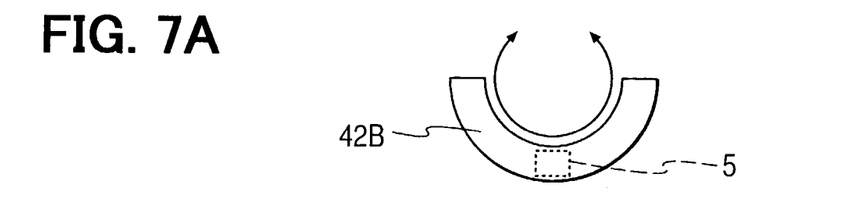
FIGS. 7A and 7B are plan and side views of a second example of a sensor magnet for the embodiment of the present invention.
Figure 7B:
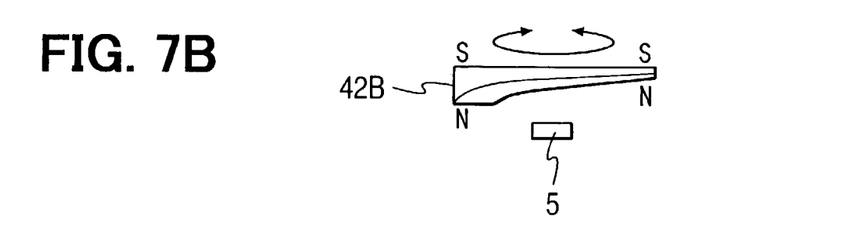

A substantially 180 degrees arc-shaped magnet 42B (sloped arc-shaped magnet) shown in FIGS. 7A and 7B as the second example, an upper surface and a lower surface of which are magnetic surfaces, has a taper. The thickness of the magnet 42B becomes thinner from one circumferential end toward the other circumferential end. A sloped surface in opposition to the hall element 5 is a north pole or a south pole. Therefore, in accordance with the rotational position of the drive shaft 3, the magnetic flux is increased or decreased in one circumferential direction.

Figure 8A:
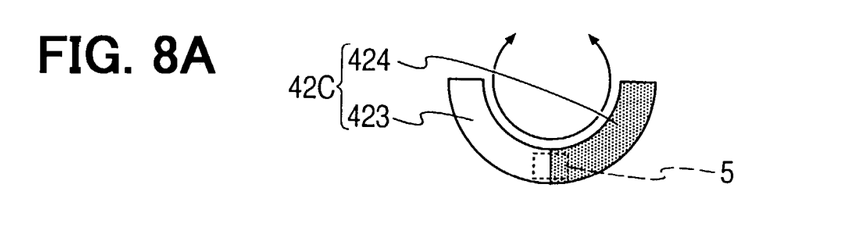
FIGS. 8A and 8B are plan and side views of a third example of a sensor magnet for the embodiment of the present invention.
Figure 8B:
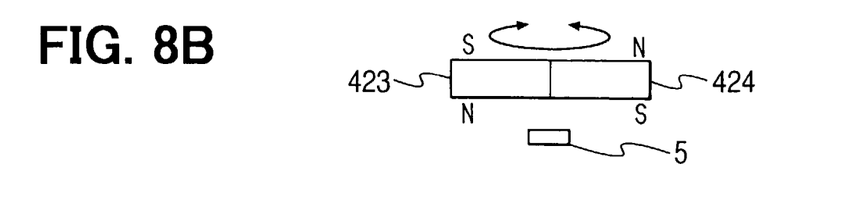
Figure 9:
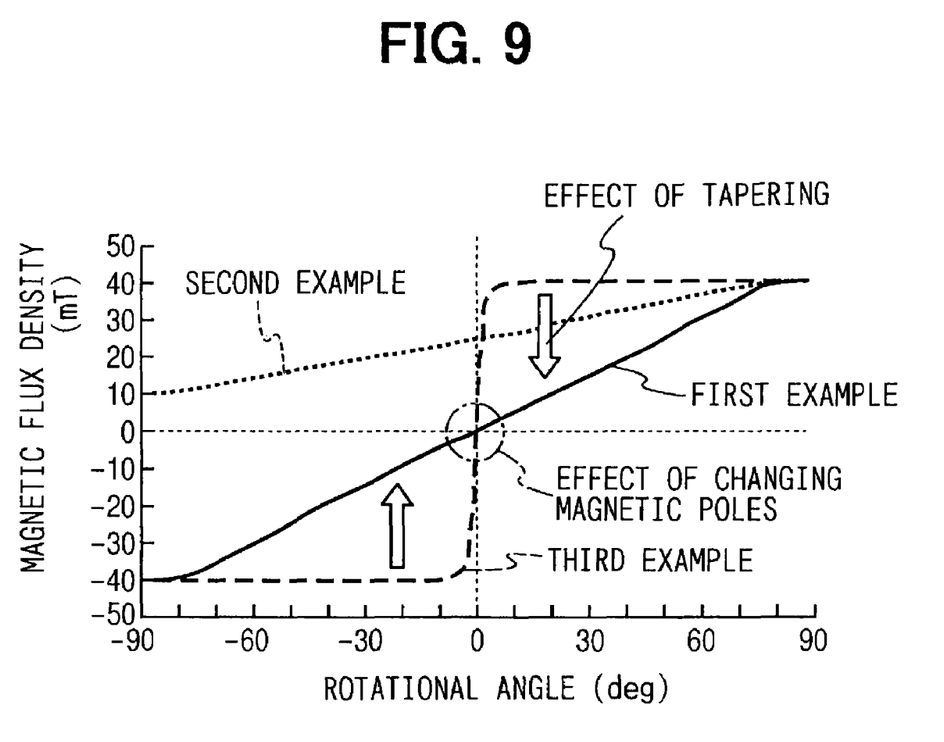
FIG. 9 is a graph showing effects of the embodiments with the use of the first to third sensor magnets.

A magnet 42C (arc-shaped magnet unit) shown in FIGS. 8A and 8B as the third example includes magnets (arc-shaped magnet portions) 423, 424 integrally. Each of the magnets 423, 424 has a substantial 90 degrees arc-shape, so that the magnet 42C has a substantial 180 degrees arc-shape. One surface of the magnet 423 in opposition to the hall element 5 is the north pole, and one surface of the magnet 424 in opposition to the hall element 5 is the south pole. The magnets 423, 424 are substantially equal magnets, but the polar characteristics of the same are contrary. Thicknesses of the magnets 423, 424 are constant. When the magnet 42C is used, the magnetic flux in their attaching parts is canceled out. Therefore, in one rotational angle of the drive shaft 3, the magnetic flux detected in the hall element 5 becomes 0, and the sign of the magnetic flux is inverted. The amount of the magnetic flux except for the rotational position where the magnetic flux density becomes 0 is constant.

The magnetic flux of the magnetic circuit of the magnet 42B only increases or decreases in accordance with the revolution of the drive shaft 3. Moreover, in the magnetic circuit of the magnet 42C, only the sign of the magnetic flux is inverted at a predetermined rotational position. Therefore, the magnetic circuit of the magnet 42A has an output characteristic more superior to that of the magnet 42B and that of the magnet 42C. That is, in the magnetic circuit of the magnet 42A, in addition to the stability in the 0 degree point, a linear characteristic can be realized. Moreover, in comparison of the magnetic circuits of the magnets 42A, 42B, a thick degree of the thick part and a thin degree of the thin part are same, the change of the magnetic flux of the magnetic circuit of the magnet 42A is twice as much as that of the magnet 42B, so that the resolving performance of the magnetic circuit of the magnet 42A is twice as much as that of that of the magnet 42B.

Moreover, when the characteristic of the magnetic flux of the magnetic circuit satisfies a predetermined qualification, the yoke between the hall element 5 and the magnetic circuit need not be provided.

In this embodiment, the magnetic detecting direction of the hall element 5 is disposed in the diametrical direction of the motor shaft 22, where the magnetic flux is generated most in each direction penetrating through the magnet clearances 231, 232, so that the influence of the leaking magnetic flux of the magnetic circuit is minimized. However, when the characteristic of the leaking magnetic flux density satisfies the predetermined qualification, the position of the hall element 5 is not limited in the position described above.

The hall element 5 serves as the magnetic flux detecting device for detecting the magnetic flux of the sensor magnet 42. However, the magnetic flux detecting device is not limited in the hall element 5.

In view of the purpose of the present invention, it is desired that the hall element 5 is disposed in each direction penetrating through the magnet clearances 201, 202. However, it is not limited that the hall element 5 is disposed in that position.

Moreover, the magnetic circuit including two magnets is introduced. However, the present invention can be employed for one where more than two magnets are disposed in an area where the magnetic circuit forms a magnetic field.

What is claimed is:

1. A magnetic sensor unit unit comprising:
   an actuator motor having a magnetic circuit; and
   a magnetic position sensor for magnetically detecting a rotational position of the actuator motor, the magnetic position sensor including;
   a magnetic flux detecting means; and
   a magnetic flux generating means, which is movable with the actuator motor and generates a predetermined amount of magnetic flux toward the magnetic flux detecting means in accordance with the rotational position of the actuator motor,
   wherein the magnetic flux detecting means is disposed in a position and a direction outside of the magnetic circuit, where the magnetic flux detecting means is substantially unresponsive to leaking magnetic flux of the magnetic circuit, wherein:
   the magnetic circuit includes two motor magnets, wherein the motor magnets are disposed apart, and opposed surfaces of the motor magnets are magnetized in different magnetic poles; and
   the magnetic detecting means is disposed to detect the magnetic flux, wherein a direction of the magnetic flux detecting means to detect the magnetic flux penetrates through magnet clearances between the motor magnets and is perpendicular to a direction from one of the motor magnets to the other.

2. A magnetic sensor unit comprising:
   an actuator motor having a magnetic circuit; and
   a magnetic position sensor for magnetically detecting a rotational position of the actuator motor, the magnetic position sensor including;
   a magnetic flux detecting means; and
   a magnetic flux generating means, which is movable with the actuator motor and generates a predetermined amount of magnetic flux toward the magnetic flux detecting means in accordance with the rotational position of the actuator motor,
   wherein the magnetic flux detecting means is disposed in a position and a direction outside of the magnetic circuit, where the magnetic flux detecting means is substantially unresponsive to leaking magnetic flux of the magnetic circuit,
   further comprising a partitioning board, which is disposed between the magnetic circuit and the magnetic position sensor, wherein the partitioning board serves as a yoke that collects the leaking magnetic flux, whereby the magnetic flux detecting means is substantially unresponsive to the leaking magnetic flux,
   wherein the partitioning board has a stepped portion facing and projecting toward the magnetic flux detecting means.

3. A magnetic sensor unit according to claim 1 wherein the magnetic flux generating means includes a sensor magnet made of a permanent magnet, one magnetic surface of which is opposed to the magnetic flux detecting means and generates the magnetic flux whereto.

4. A magnetic sensor unit comprising:
   an actuator motor having a magnetic circuit; and
   a magnetic position sensor for magnetically detecting a rotational position of the actuator motor, the magnetic position sensor including;
   a magnetic flux detecting means; and
   a magnetic flux generating means, which is movable with the actuator motor and generates a predetermined amount of magnetic flux toward the magnetic flux detecting means in accordance with the rotational position of the actuator motor,
   wherein the magnetic flux detecting means is disposed in a position and a direction outside of the magnetic circuit, where the magnetic flux detecting means is substantially unresponsive to leaking magnetic flux of the magnetic circuit,
   wherein the magnetic flux generating means includes a sensor magnet made of a permanent magnet, one magnetic surface of which is opposed to the magnetic flux detecting means and generates the magnetic flux whereto, wherein:
   the sensor magnet is a sloped arc-shaped magnet unit essentially composed of two sloped arc-shaped magnet portions;
   the arc-shaped magnet portions have substantially same shapes and same magnetic forces;
   one of the arc-shaped magnet portions is magnetized in a magnetic detecting direction of the magnetic flux detecting means, and the other is magnetized in a direction contrary to the magnetic detecting direction;
   each of the sloped arc-shaped magnet portions has a sloped magnetic surface in opposition to the magnetic flux detecting means and tapers in one circumferential direction; and
   thinnest circumferential ends of the arc-shaped magnet portions are integrated and form a thinnest part of the arc-shaped magnet unit.

5. A magnetic sensor unit comprising:
   a motor having first magnet means for generating first magnetic flux to rotate a motor shaft;
   second magnet means, coupled to the motor shaft to be rotated by the motor and disposed radially outside the motor, for generating second magnetic flux;

magnetic flux detecting means, disposed between the motor and the second magnet means, for detecting the second magnetic flux applied from the second magnet means to thereby detect a rotational position of the motor shaft; and a magnetic shield plate, disposed between the motor and the magnetic flux detecting means, for providing a magnetic circuit of leaking magnetic flux of the first magnet means so that the magnetic flux detecting means is responsive to the second magnetic flux and substantially unresponsive to the leaking magnetic flux of the first magnet means of the motor.

6. A magnetic sensor unit according to claim 5, wherein the magnetic shield plate has a step raised toward the magnetic flux detecting means.

7. A magnetic sensor unit according to claim 5, wherein the second magnet means is arc-shaped to rotate around an axis perpendicular to the motor shaft and has a varying thickness in a circumferential direction thereby to vary the second magnetic flux applied to the magnetic flux detecting means in accordance with the rotational position of the motor shaft.

* * * * *